US012339921B2

(12) United States Patent
Eriksson et al.

(10) Patent No.: US 12,339,921 B2
(45) Date of Patent: Jun. 24, 2025

(54) CONSTRAINT RESOURCE OPTIMIZATION USING TRUST REGION MODELING

(71) Applicant: Uber Technologies, Inc., San Francisco, CA (US)

(72) Inventors: David Mikael Eriksson, San Francisco, CA (US); Matthias Ullrich Poloczek, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 708 days.

(21) Appl. No.: 17/076,103

(22) Filed: Oct. 21, 2020

(65) Prior Publication Data

US 2021/0063188 A1   Mar. 4, 2021

Related U.S. Application Data

(63) Continuation-in-part of application No. 17/010,725, filed on Sep. 2, 2020.

(60) Provisional application No. 62/941,731, filed on Nov. 28, 2019, provisional application No. 62/923,997, filed on Oct. 21, 2019, provisional application No. 62/895,318, filed on Sep. 3, 2019.

(51) Int. Cl.
| | | |
|---|---|---|
| *G06Q 10/00* | (2023.01) | |
| *G06F 9/50* | (2006.01) | |
| *G06F 17/11* | (2006.01) | |
| *G06N 7/01* | (2023.01) | |
| *G06Q 10/0631* | (2023.01) | |
| *G06Q 50/40* | (2024.01) | |

(52) U.S. Cl.
CPC ............. *G06F 17/11* (2013.01); *G06F 9/505* (2013.01); *G06F 9/5072* (2013.01); *G06N 7/01* (2023.01); *G06Q 10/0631* (2013.01); *G06Q 50/40* (2024.01)

(58) Field of Classification Search
None
See application file for complete search history.

(56) References Cited

U.S. PATENT DOCUMENTS

| | | | | |
|---|---|---|---|---|
| 10,257,275 | B1 * | 4/2019 | Dirac | H04L 67/1097 |
| 11,410,076 | B1 * | 8/2022 | Huszar | G06F 17/11 |
| 2003/0046278 | A1 * | 3/2003 | McConaghy | G06F 30/36 |

(Continued)

OTHER PUBLICATIONS

A Khalfay (Optimization heuristics for solving technician and task scheduling problems) 2018—e-space.mmu.ac.uk. (Year: 2018).*

(Continued)

*Primary Examiner* — Hafiz A Kassim
(74) *Attorney, Agent, or Firm* — Fenwick & West LLP

(57) ABSTRACT

A system optimizes an objective function by iteratively refining the objective function. The system evaluates an initial set of results for a set of initial candidates according to an objective function. The system generates a local model. The system identifies a plurality of new candidates. The system determines, for each new candidate, a prediction of whether the candidate violates a constraint. The system selects a new candidate based on the prediction for each of the candidates and updates the local model using the new candidate. The system identifies a potential optimal solution from the updated local model. The system distributes resources of a computing system according to the potential optimal solution.

19 Claims, 10 Drawing Sheets

(56) References Cited

U.S. PATENT DOCUMENTS

| | | | |
|---|---|---|---|
| 2005/0198102 A1* | 9/2005 | Hahn | G06F 9/468 |
| | | | 709/200 |
| 2007/0038657 A1* | 2/2007 | Denton | G06Q 10/04 |
| 2012/0116850 A1* | 5/2012 | Abe | G06Q 10/067 |
| | | | 705/7.38 |
| 2012/0284090 A1* | 11/2012 | Marins | G06Q 10/0631 |
| | | | 705/7.39 |
| 2015/0178756 A1* | 6/2015 | Chao | G06Q 30/0217 |
| | | | 705/14.19 |
| 2015/0228004 A1* | 8/2015 | Bednarek | G06Q 30/0633 |
| | | | 705/26.8 |
| 2016/0063411 A1* | 3/2016 | Ravichandran | G06Q 10/06312 |
| | | | 705/7.22 |
| 2017/0316459 A1* | 11/2017 | Strauss | G06Q 30/0269 |
| 2018/0025374 A1* | 1/2018 | Ghosh | G06Q 10/063114 |
| | | | 705/7.15 |
| 2019/0158426 A1* | 5/2019 | El Gamal | H04W 28/02 |
| 2019/0325304 A1* | 10/2019 | Gottin | G06N 3/045 |
| 2019/0378066 A1* | 12/2019 | Zhu | G06Q 10/0633 |
| 2020/0057975 A1* | 2/2020 | Legrand | G06N 5/01 |
| 2020/0189098 A1* | 6/2020 | Kalakrishnan | B25J 9/1653 |
| 2020/0234582 A1* | 7/2020 | Mintz | G08G 1/096811 |
| 2022/0261833 A1* | 8/2022 | Shang | G06N 3/08 |

OTHER PUBLICATIONS

Bruce Golden, S. Raghavan, and Edward Wasil et al. The Vehicle Routing Problem: Latest Advances and New Challenges, ISBN: 978-0-387-77777-1, 2008). (Year: 2008).*

R Vosooghi (Shared autonomous vehicle service design, modeling, and simulation) 2019—theses.hal.science. (Year: 2019).*

H Wang, H Yang et al. (Ridesourcing systems: A framework and review)—Transportation Research Part B: Methodological, 2019—Elsevier. (Year: 2019).*

Golden, B. et al. "The Vehicle Routing Problem: Latest Advances and New Challenges." New York: Springer, ORCS vol. 43, Jul. 20, 2008, pp. 1-396.

Deng, G. "Simulation-based optimization." Diss, University of Wisconsin—Madison, 2007, pp. 1-248.

United States Pre-Interview Communication, U.S. Appl. No. 17/010,725, May 16, 2023, four pages.

* cited by examiner

760

```
┌─────────────────────────────────────────────────┐
│ Determine a new observation for selected        │
│ candidate with the highest utility score, the   │
│ observation set evaluated according to the      │
│ objective function and the constraints          │
│ evaluation functions                            │
│ 810                                             │
└─────────────────────────────────────────────────┘
                        ↓
┌─────────────────────────────────────────────────┐
│ Update predictions of local model to include    │
│ new observation for selected candidate          │
│ 820                                             │
└─────────────────────────────────────────────────┘
                        ↓
┌─────────────────────────────────────────────────┐
│ Determine if selected candidate has higher      │
│ utility than center of trust region             │
│ 830                                             │
└─────────────────────────────────────────────────┘
                        ↓
           Yes      ◇ Success? ◇      No
         ┌──────────┘          └──────────┐
         ↓                                ↓
┌──────────────────────┐      ┌──────────────────────┐
│ Re-center trust      │      │                      │
│ region to selected   │      │                      │
│ candidate            │      │                      │
│ 840                  │      │                      │
└──────────────────────┘      │                      │
         ↓                     │                      │
┌──────────────────────┐      ┌──────────────────────┐
│ Increase success     │      │ Increase failure     │
│ counter ($n_s$)      │      │ counter ($n_f$)      │
│ 850                  │      │ 855                  │
└──────────────────────┘      └──────────────────────┘
         └──────────────┬─────────────────┘
                        ↓
           ┌─────────────────────────┐
           │ Resize trust region     │
           │ based on counters       │
           │ 860                     │
           └─────────────────────────┘
```

FIG. 8

CONSTRAINT RESOURCE OPTIMIZATION USING TRUST REGION MODELING

CROSS REFERENCE TO RELATED APPLICATIONS

This application is a Continuation-in-part of co-pending U.S. patent application Ser. No. 17/010,725, filed Sep. 2, 2020, which claims the benefit of U.S. Provisional Application No. 62/895,318, filed Sep. 3, 2019, and U.S. Provisional Application No. 62/923,997, filed Oct. 21, 2019.

This application also claims the benefit of U.S. Provisional Application No. 62/923,997, filed Oct. 21, 2019, and U.S. Provisional Application No. 62/941,731, filed Nov. 28, 2019, each of which is incorporated by reference in its entirety.

BACKGROUND

This present disclosure generally relates to an optimization technique particularly implemented in a resource allocation objective function.

Several systems perform optimization in a high-dimensional search space to optimize resources allocated, for example, robotic control systems, autonomous vehicles, or online systems. The system performs the optimization by attempting to enforce a set of constraints to be satisfied by the selected resource allocation. When allocating resources, a resource allocation objective function can broadly describe a plethora of variables that affect an output by the resource allocation objective function. Due to sheer number of potential variables, the resource allocation objective function could be a high-dimensional function, e.g., greater than 20 variables. Moreover, the resource allocation objective function may not be explicitly defined nor easily solvable for the optimal allocation of resources by a system. Conventional techniques can often use objective functions that are costly to generate or impossible to generate, i.e., the explicit function is not known. Moreover, they produce sub-optimal solutions if local optima are present.

SUMMARY

Systems according to various embodiments perform optimization in a high-dimensional search space to optimize resources to be allocated. An example system is a transport service system that includes multiple drivers and riders over a set of cities. An objective function uses a set of variables associated with the resources that may be distributed among the different components of the system. The system implements a Bayesian optimization technique utilizing a tailored local modeling. Although the techniques are described in the context of a transport service system, these techniques are applicable to any computing system that is configured to optimize resources, for example, a control system of a robot, a system configured to move such as a self-driving vehicle, and so on.

The system evaluates a set of initial candidates, each given by a vector in the high-dimensional search space. The system evaluates the set of initial candidates according to at least an objective function. In some embodiments, the system also evaluates the set of initial candidates according to a set of constraint functions. The system generates a local model using the evaluations for the set of initial candidates. In an embodiment, each local model includes a Gaussian process posterior distribution for the objective function over a trust region centered around some previously evaluated candidate. The system then iteratively updates the local model to find a solution to the objective function. After a set number of iterations, the system identifies a potential optimal solution from the updated local model. The system then distributes resources according to the best allocation found.

To update the local model, the system identifies multiple new candidates. For each candidate, the system determines a prediction of whether the new candidate violates a constraint based on the local model, and determines a utility score for the new candidate. The utility score is at least based on the prediction of whether the new candidate violates a constraint. The system selects a new candidate based on the utility score of each new candidate. After selecting a new candidate, the system evaluates a subsequent result for the selected new candidate. The subsequent result is evaluated according to at least the objective function. In some embodiments, the subsequent result is also evaluated according to the set of constraint functions. The system updates the local model based on the subsequent result.

BRIEF DESCRIPTION OF THE DRAWINGS

FIG. 8 illustrates a flowchart updating a local model during using a selected candidate, in accordance with one or more embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
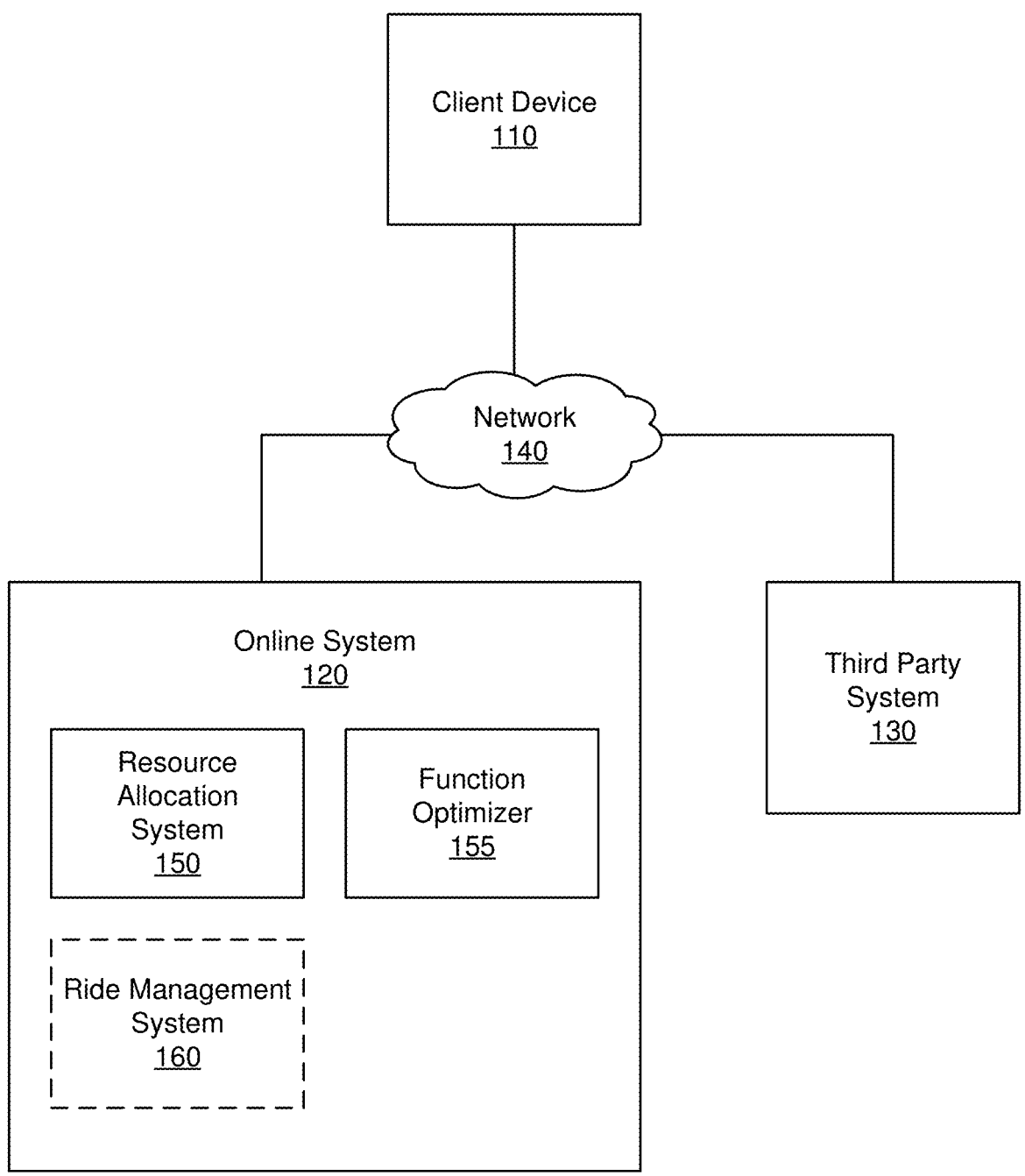
FIG. 1 illustrates a networking environment for an online system, in accordance with one or more embodiments.

FIG. 1 illustrates networking environment for an online storage system, in accordance with one or more embodiments. FIG. 1 includes a client device 110, an online system 120, a third-party system 130, and a network 140. The online system 120 includes a resource allocation system 150 that allocates resources for the online system 120, and a function optimizer 155 that finds a likely solution for an objective function used by the resource allocation system 150.

In some embodiments, the online system 120 is a transport service system that connects riders and drivers for ridesharing transactions. In these embodiments, resources include budget, personnel, time, other monetary incentives, etc. The online system 120, in these embodiments, may also include a ride management system 160 that manages one or more aspects of the ridesharing transactions with each rider and/or driver associated with a client device 110. For clarity, only one client device 110 is shown in FIG. 1, but in reality, multiple client devices 110 may communicate with any component over the network 140. Alternate embodiments of the system environment 100 can have any number online systems 120 and document databases 130. The functions performed by the various entities of FIG. 1 may also vary in different embodiments.

Although the system shown in FIG. 1 is described in the context of an online system, the present disclosure is not limited to online system. For example, the resource allocation system 150 and the function optimizer 155 can also be used in physical systems (such as a system for finding the optimal design for the mass of the vehicle subject to a set of constraints, a system for landing a space shuttle subject to a set of constraints, or a system for navigating a vehicle subject to a set of constraints).

Users interact with the online system 120 through the client device 110. The client device 110 can be personal or mobile computing devices, such as smartphones, tablets, or notebook computers. The client device 110 may interact with the online system 120 through client applications configured to interact with the online system 120.

In embodiments of the online system 120 as a transport service system, users and drivers may interact with the client applications of the client devices 110 to request and access information about rides arranged. The client applications can present information received from the transport service system on a user interface, such as a map of the geographic region, the estimated trip duration, and other information. Additionally, the client devices 110 may provide their location and other data to the transport service system. For example, a current location of a client device 110 may be designated by a user or driver or detected using a location sensor of the client device (e.g., a global positioning system (GPS) receiver) and provided to the transport service system as coordinates. With drivers and riders, the online system 120 can provide incentives to the drivers and riders via the client devices 110 associated with drivers and riders.

The online system 120 allocates resources, e.g., via the resource allocation system 150. The resource allocation system 150 determines how to allocate resources amongst the online system 120. The resource allocation system 150 defines an objective function that inputs one or more of variables (e.g., the objective function may be a high-dimensional function in Ω space) and outputs a score (e.g., a scalar value in). In defining the objective function, the resource allocation system 150 may determine various interrelationships between the variables which eventually result in the output. In some implementations, the objective function is not explicitly defined (e.g., not have a closed form) and thus be evaluated via a complex simulation. Variables may include incentives to provide to drivers and incentives to provide to riders for a plurality of cities serviced in a transport service system. In other embodiments, variables may further (or rather) include fine-granular resource allocations to specific cohorts of drivers and riders. The output in this embodiment may be a profitability of the transport service system due to the provided incentives across the various drivers and/or riders over the plurality of cities. In other embodiments, the output of the objective function could be another metric, e.g., usage of the transport service system, predicted change in number of drivers and/or riders, etc.

The resource allocation system 150 determines attempts to use an optimal solution for the variables that optimizes the output of the objective function. The objective function might have a true optimal solution that is not trivially derivable with the objective function. As such, the resource allocation system 150 uses the function optimizer 155 to identify a likely optimal solution for the objective function. The components of the resource allocation system 150 are described in more detailed below in conjunction with FIG. 2A.

The function optimizer 155 implements a Bayesian optimization technique with trust region modeling to obtain a best guess of the true optimal solution. The function optimizer 155 initializes a set of random candidates to evaluate outputs from the objective function. From the initial set of random candidates, the function optimizer 155 generates one or more of trust regions. In one embodiment, each trust region is a hypercube centered around a random candidate. The function optimizer 155 generates a local model for each trust region modeling the objective function within the trust region according to sampled candidates and the corresponding observations in the trust region. The function optimizer 155, for each trust region, identifies subsequent candidates to evaluate. With the identified subsequent candidates, the function optimizer 155 evaluates the result for the subsequent candidates with the objective function. The function optimizer 155 identifies an optimal solution from among all evaluated candidates having the maximal output. The components of the function optimizer 155 are described in more detailed below in conjunction with FIG. 2B.

According to the optimal candidate, the resource allocation system 150 allocates resources across the online system 120, e.g., distributing incentives to various drivers and/or riders across the plurality of cities. This process for optimizing an objective function and allocating resources is further described below in conjunction with FIGS. 2-7.

In some embodiments, the resource allocation system 150 updates the objective function, e.g., periodically. In practicality, conditions of the system whose resources are being allocated by the resource allocation system 150 changes throughout the course of time. For example, in a transport service system, usage by drivers and/or riders of the transport service system constantly changes throughout the course of time. The resource allocation system 150 may update the objective function according to these changes. For example, in a transport service system, some drivers can stop usage while other new drivers are added to the transport service system. These changes could affect the interrelationship between variables in the objective function. As another example, the transport service system may add additional cities to be serviced. This could redefine the objective function by adding variables, i.e., increasing dimensionality of the objective function.

In some embodiments, a ride management system 160 manages rideshare transactions. In managing rideshare transactions, the ride management system 160 may implement various algorithms for connecting riders and drivers.

Each trip can be logged, e.g., recording a date of the trip, a time of the trip, a route traveled, a rider, a driver, a calculated fare, payment received, discount codes used, any delays, any excess fees, any notes, ratings, other trip information, etc. The ride management system 160 may provide information for a trip all at once or as each piece of information is received or calculated. The ride management system 160 may also log statistics regarding rideshare transactions. The statistics can be used to describe correlative effects between variables and/or metrics, e.g., with regression techniques. For example, there can be a positive linear correlation between incentives provided to drivers in San Francisco, California, with profitability in San Francisco, California. These correlative effects can be used in defining the objective function, or more generally, the statistics may be used for defining the objective function.

In some embodiments, the third-party system 130 provides one or more variables to the online system 120 for the objective function. The third-party system 130 may be separate and/or distinct from the online system 120, yet the objective function may include variables from the third-party system 130. As such, the third-party system 130 may also receive resources from the online system 120, e.g., as an intermediary system to distribute the resources or to consume the resources. For example, the third-party system 130 may be an advertising system that distributes advertisements for the online system 120 while receiving compensation (e.g., which may be a resource).

The various components of the system environment 100 communicate via the network 130. The network 130 comprises any combination of local area and wide area networks employing wired or wireless communication links. In some embodiments, all or some of the communication on the network 130 may be encrypted. For example, data encryption may be implemented in situations where the third-party system 130 is located on a third-party online system separate from the online system 120.

Resource Allocation System Architecture

Figure 2A:
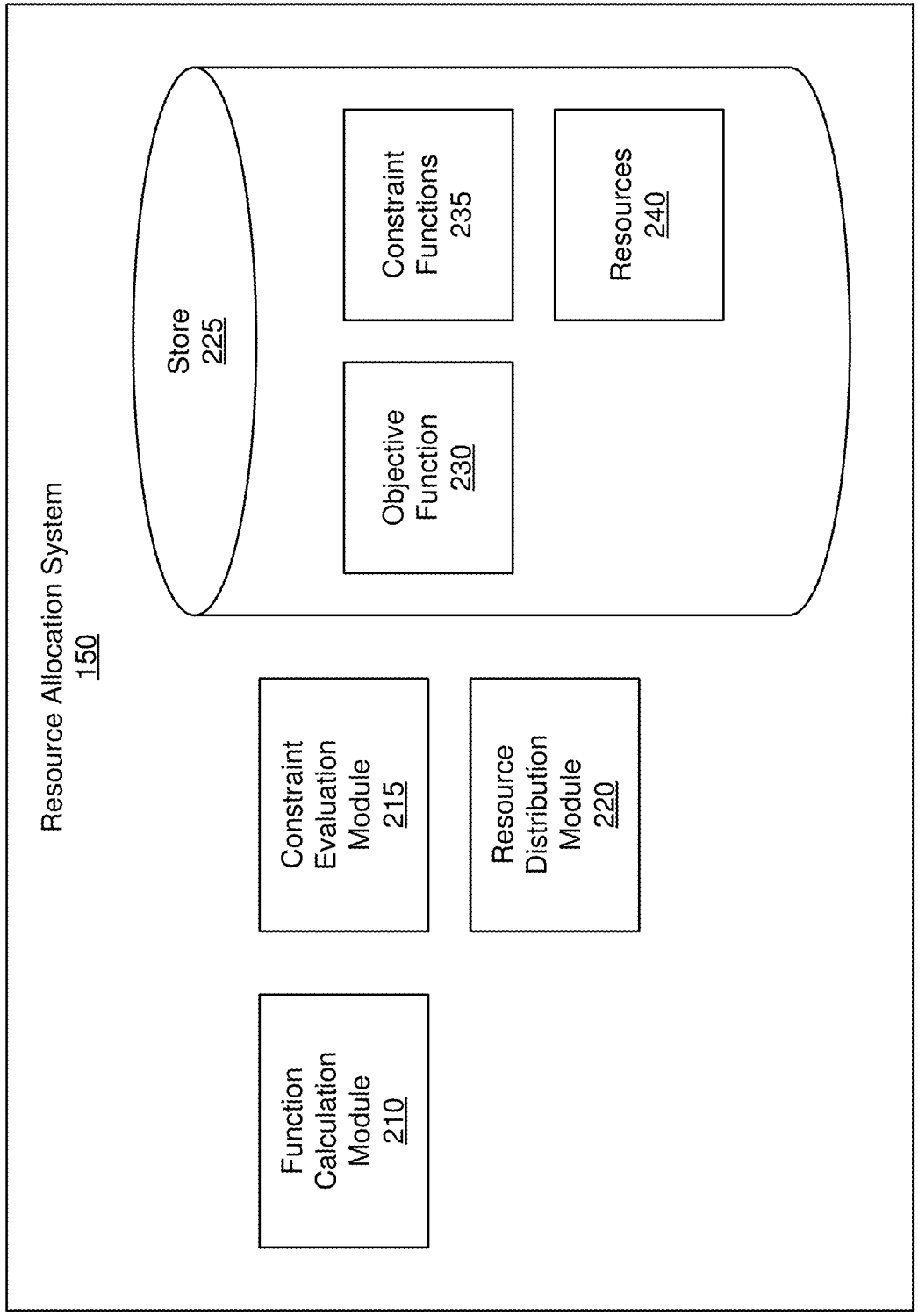
FIG. 2A illustrates an exemplary architecture of a resource allocation system, in accordance with one or more embodiments.

FIG. 2A illustrates an exemplary architecture of the resource allocation system 150, in accordance with one or more embodiments. The resource allocation system 150 allocates resources of the online system 120. In the process of allocating resources, the resource allocation system 150 maintains an objective function and uses the function optimizer 155 to determines an optimal allocation that optimizes an output of the objective function for determining how to allocate resources. Moreover, the resource allocation system 150 maintains a number of constraints to be satisfied. As such, the function optimizer 155 determines the optimal allocation that optimizes the output of the objective function $f(x)$, while satisfying all of the constraints $c_i: 1 \leq l \leq m$. That is, the resource allocation system 150 finds the solution to the problem:

$$\min_{x \in \Omega} f(x) \text{ subject to } c_1(x) \leq 0, \ldots, c_m(x) \leq 0 \qquad (1)$$

Where $f: \Omega \to \mathbb{R}$ and $c_j: \Omega \to \mathbb{R}$ are black-box functions defined over a compact set $\Omega \subset \mathbb{R}^d$.

The resource allocation system 150 has, among other components, a function calculation module 210, a constraint evaluation module 215, a resource distribution module 220, and a store 225. Turning to the store 225, the store 225 maintains the objective function 230, the constraint functions 235, and resources 240 to be allocated and/or distributed. In other embodiments, the resource allocation system 150 has additional or fewer components than those listed herein. The functions and operations of the various modules may also be interchanged amongst the modules.

The function calculation module 210 maintains the objective function 230. The function calculation module 210 receives definition input from, e.g., one or more client devices 110, to define the objective function 230. Definition input can include what variables are included in the objective function 230 and the interrelationships between the variables. As such, the objective function 230 may be a high-dimensional function that is not explicitly defined. According to subsequent definition inputs, the function calculation module 210 may update or adjust the objective function 230. For example, the function calculation module 210 receives definition to adjust the objective function 230 to add additional variables, e.g., incentives provided to drivers and incentives provided to users in new cities serviced by the transport service system. In other examples, the function calculation module 210 adjusts the interrelationships between variables, wherein the interrelationships define effects of one or more variables on other variables.

The function calculation module 210 evaluates a result for a candidate with the objective function 230. The function calculation module 210 takes a candidate as a vector with values for each of the variables of the objective function 230 and inputs the values into the objective function 230. The various mathematical operations are evaluated with the function calculation module 210 to obtain a result of the objective function 230 according to the input vector. In some implementations, the function calculation module 210 may include one or more workers. For example, the function calculation module 210 include multiple workers and each worker evaluates a result for a candidate according to the objective function 230 in parallel with the other workers. In practice, to minimize evaluation time, the function calculation module 210 may assign candidates to be evaluated for a result to each worker. The workers proceed with evaluating results according to the objective function 230 in parallel, i.e., simultaneously and/or independent of another worker. The function calculation module 210 may assign candidates to workers synchronously—waiting until all workers finish a current batch of candidates before assigning a new batch—or asynchronously—assigning a new candidate to the worker whenever that worker finishes its evaluation of a previous candidate. When results are evaluated, the function calculation module 210 may store and tabulate the results in the store 280.

The constraint evaluation module 215 evaluates if a candidate violates a constraint. If the constraint is violated by the candidate, the constraint evaluation module 215 determines a numerical value as a score indicative of the degree of the violation. That is, the constraint evaluation module 215 determines a numerical value based on how far the candidate was from meeting (or satisfying) the constraint. Moreover, in some embodiments, if the constraint is met by the candidate (i.e., for each constraint not violated), the constraint evaluation module 215 determines a numerical value as a score indicative of how well the constraint was met. That is, the constraint evaluation module 215 determines a numerical value based on how far the candidate was from violating the constraint. In other embodiments, the constraint evaluation module 215 simply determines a Boolean value for each constraint. That is, the constraint evaluation module 215 determines if the candidate violated or met the constraint.

The constraint evaluation module 215 maintains a constraint function 235 for each constraint. The constraint evaluation module 215 receives definition input, from, e.g., one or more client devices 110, to define the constraint functions 235. Definition input can include what variables are included in each constraint function 235 and the interrelationships between the variables. As such, the constraint function 235 may be a high-dimensional function that is not explicitly defined. For example, the constraint evaluation module 215 receives definition to adjust one or more constraint functions 235 to add or remove variables. In other examples, the constraint evaluation module 215 adjusts the interrelationships between variables, wherein the interrelationships define effects of one or more variables on other variables. Alternatively, one or more constraint functions 235 may be explicitly defined functions that are calculated based on elements of the vector for the candidate. For example, a constraint function 235 may be a close-form function that determines a numerical value from one or more elements of the vector for the candidate.

The constraint evaluation module 215 takes a candidate as a vector with values for each of the variables of each of the constraint functions 235 and inputs the values into each constraint function 235.

The various mathematical operations are evaluated with the constraint evaluation module 215 to obtain an output for a constraint function 235 according to the input vector. In some implementations, the constraint evaluation module 215 may include one or more workers. For example, the constraint evaluation module 215 include multiple workers and each worker evaluates a constraint for a candidate according to one constraint function 235 in parallel with the other workers. In some embodiments, the constraint evaluation module 215 share its workers with the function calculation module 210. In practice, to minimize evaluation time, the constraint evaluation module 215 may assign candidates to be evaluated for a constraint to each worker. The workers proceed with evaluating constraints according to the constraint function 235 in parallel, i.e., simultaneously and/or independent of another worker. The constraint evaluation module 215 may assign candidates to workers synchronously—waiting until all workers finish a current batch of candidates before assigning a new batch—or asynchronously—assigning a new candidate to the worker whenever that worker finishes its evaluation of a previous candidate. When constraints are evaluated, the constraint evaluation module 215 may store and tabulate the constraints in the store 280.

The resource distribution module 220 receives a result from the function optimizer 155 and selects an optimal solution to determine how to distribute the resources. For example, the resource distribution module 220 may receive the evaluations for one or more candidates identified by the function optimizer 155. The resource distribution module 220 considers the received evaluations and selects an optimal solution with the best result among the list of evaluations. Timing-wise, the resource distribution module 220 may select the optimal solution according to the time budget and/or the evaluation budget described above. For example, a time budget dictates when the resource distribution module 220 selects from the list of solutions. With the evaluation budget, the resource distribution module 220 selects the optimal solution when the evaluation budget is exhausted, i.e., when the number of evaluations specified by the evaluation budget is reached.

According to the selected optimal solution, the resource distribution module 220 distributes the resources 240. The value for each variable in the optimal solution indicates a quantity of a resource to be distributed to the corresponding entity associated with the variable. For example, the vector consists of four total variables: (i) incentives for drivers in City A, (ii) incentives for riders in City A, (iii) incentives for drivers in City B, and (iv) incentives for riders in City B. If the optimal solution is [1, 3, 2, 5], then the corresponding distribution of resources would be as follows: one resource distributed to (i), three resources distributed to (ii), two resources distributed to (iii), and five resources distributed to (iv).

The store 225 stores the objective function 230, and the resources 235. The objective function 230 may be generated and/or updated by various modules and then stored in the store 225. The resources 240 may include computing resources such as CPU, memory, peripherals, storage, cache, etc. The resources 240 may also include storable items such as budget and other monetary incentives, etc. Other resources may not be storable such as time, personnel, etc. In some embodiments, the store 255 storing the resources 240 that are not storable as data indicating the availability of such resources. For example, the store 255 may store personnel information including each personnel's availability for performing specific tasks.

Figure 2B:
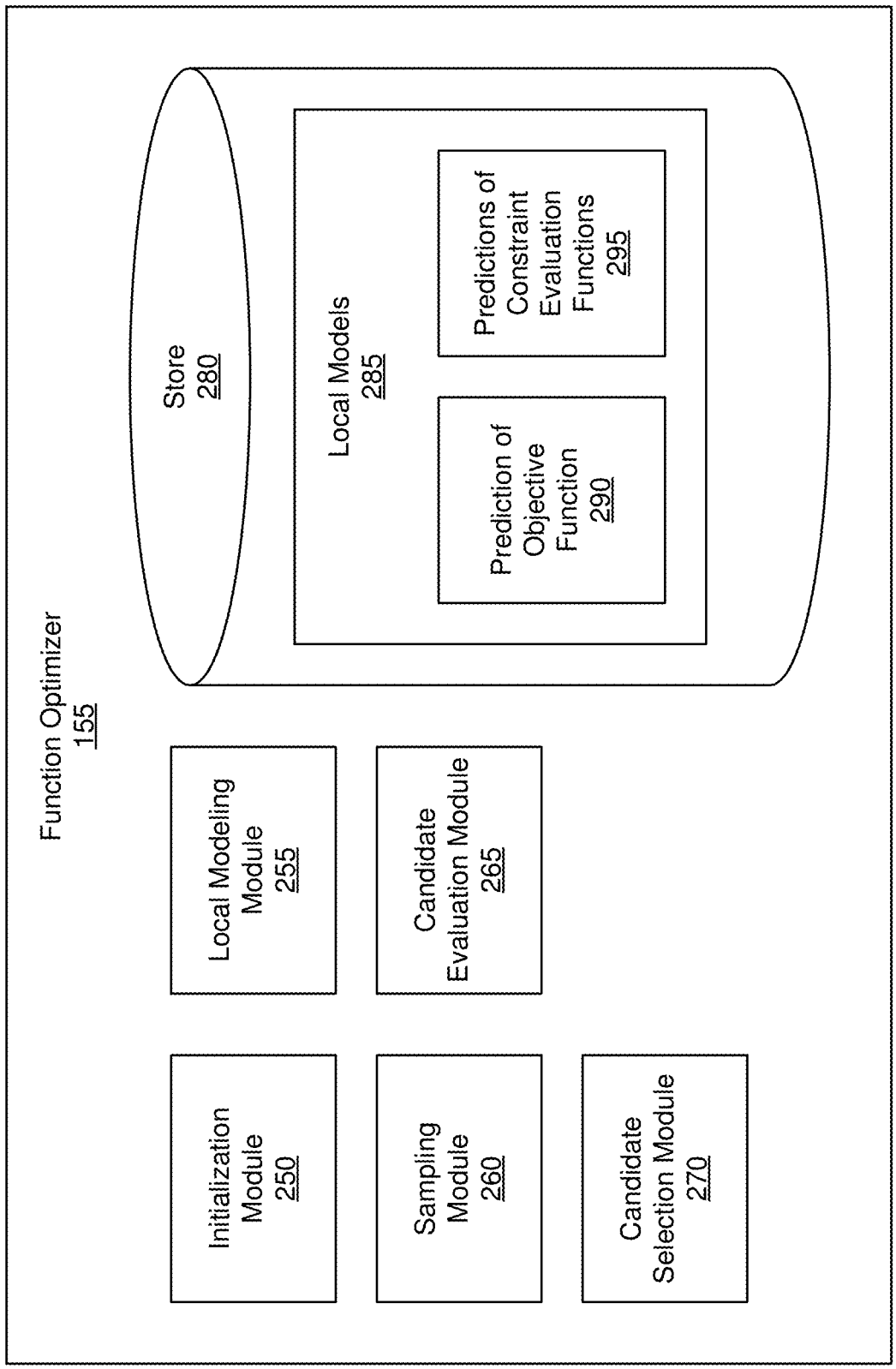
FIG. 2B illustrates an exemplary architecture of the function optimizer, in accordance with one or more embodiments.

FIG. 2B illustrates an exemplary architecture of the function optimizer 155, in accordance with one or more embodiments. The function optimizer 155 has, among other components, an initialization module 250, a local modeling module 255, a sampling module 260, a candidate evaluation module 265, a candidate selection module 270, and a store 280. Turning to the store 280, the store 280 maintains one or more local models 285 generated by the local modeling module 255. In other embodiments, the function optimizer 155 has additional or fewer components than those listed herein. The functions and operations of the various modules may also be interchanged amongst the modules.

The initialization module 250 initializes candidate. When the function optimizer 155 is attempting to optimize resource allocation, the initialization module 250 initializes a set of initial candidates. The initial candidates may be randomly selected across the variable domain of the objective function 230. In one embodiment, the initial candidates are selected with a Latin hypercube design. The initialization module 250 provides the set of initial candidates to the function calculation module 210 of the resource allocation system 150 for evaluating results.

In some embodiments, the initialization module 250 initializes candidates according to particular parameters. In one embodiment, there is a time budget. That is, the function optimizer 155 has an allotted time to determine an optimal candidate with a highest result among the evaluated results. In other embodiments, there is an evaluation budget (in substitution or in addition of the time budget). That is, the evaluation budget limits a number of evaluations prior to selecting the optimal solution. A size of the set of initial candidates—a number of candidates in the set—can depend on the time budget and/or the evaluation budget. Other budgets may further dictate when to select the optimal candidate. In other embodiments, another parameter adjusts a number of local models that are used simultaneously in optimizing the objective function 230, wherein the size of the set of initial candidates depends on this parameter.

The local modeling module 255 maintains one or more of local models modeling the objective function 230. Each local model has a trust region which is a region of the variable domain space. In one embodiment, the trust region is a hypercube according to the dimensionality of the objective function 230. The local modeling module 255 may use a trust region for each local model. In one embodiment, the local modeling module 255 creates a local model for each initial candidate (initialized by the initialization module 250). The local modeling module 255 can center the trust region for the local model around each initial candidate in the variable domain space. In other embodiments, the local modeling module 255 ranks every initial candidate and selects the best initial candidate among all of the initial candidates. The local modeling module 255 then creates only one local model using every initial candidate and centered around the identified best initial candidate.

As part of a local model, the local modeling module 255 generates a prediction 290 of the objective function 230. The prediction 290 of the objective function 230 is generated in the trust region according to one or more evaluations of the objective function 230 within the trust region. In one embodiment, the local modeling module 255 generates the prediction 290 of the objective function 230 as a Gaussian process posterior distribution according to a Gaussian process regression based on results of evaluated candidates in the local model's trust region. The Gaussian process regression is a stochastic process that supposes that the values of any given set of candidates under the objective function are drawn from a joint multivariate Gaussian distribution. The Gaussian process regression can generally be thought of as a collection of potential functions in the variable domain space. With more evaluations, wherein each evaluation is a result for a candidate, determined within the variable domain space, a Gaussian process posterior distribution of possible functions can be evolved to filter out functions that are not inclusive of the one or more evaluations. When more evaluations are computed (e.g., by the function calculation module 210), the local modeling module 255 can update the prediction 290 of the objective function 230 of the local model by adjusting the Gaussian process posterior distribution.

Figure 3:
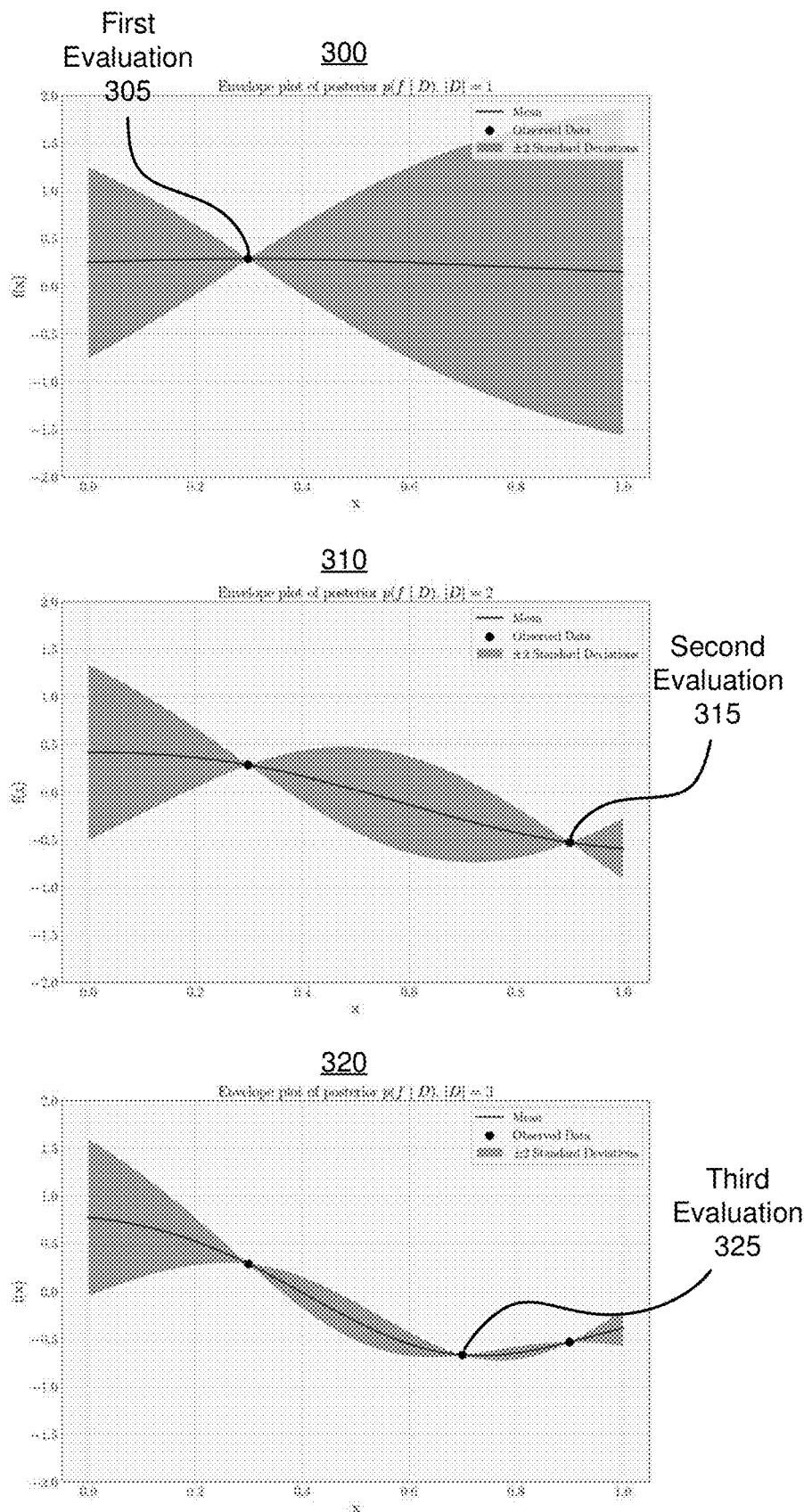
FIG. 3 illustrates a one-dimensional (1D) example evolution of a Gaussian process posterior distribution according to a Gaussian process, in accordance with one or more embodiments.

Referring now to FIG. 3, a one-dimensional (1D) example evolution of a Gaussian process posterior distribution according to a Gaussian process is shown. The top graph 300 shows an example 1D variable domain space with a first evaluation 305 is, roughly, $f(0.3)=0.25$. With the first evaluation 305, the Gaussian process regression filters out random functions over the variable domain space that do not include the first evaluation 305 according to a standard deviation. The resulting Gaussian process distribution is the shaded region which is defined from functions ±2 standard deviations from a mean function. A larger standard deviation would result in a wider spread of the distribution.

In the middle graph 310, there is a second evaluation 315 is, roughly, $f(0.9)=-0.5$. The Gaussian process posterior distribution is updated accordingly by filtering out more potential functions (previously in the Gaussian process posterior distribution shown in the top graph 300) which do not include the second evaluation 315. Noticeably, the distribution under x=0.3 (where the first evaluation 305 is) is not significantly changed, with the spread only shifting slightly positively. However, the distribution over x=0.3 (where the first evaluation 305 is) looks markedly different.

In the bottom graph 320, there is a third evaluation 325 is, roughly, $f(0.7)=-0.7$. The Gaussian process posterior distribution is updated once again. As the third evaluation 325 is between the first evaluation 305 and the second evaluation 315, the Gaussian process posterior distribution is tight between the first and the second evaluations 305 and 315, respectively.

In some embodiments when evolving a local model, the local modeling module 255 evolves the trust region of that local model. Evolution of trust regions may include, but is not limited to, shifting the trust region, adjusting a size of the trust region, adjusting a shape of the trust region, another transformation of the trust region, and any combination thereof. In some embodiments, the local modeling module 255 shifts the trust region for that local model. The shifting may be dependent on the evaluations in the trust region. In one implementation, the trust region is re-centered around the best evaluation in the trust region, which is an evaluation with a result that is optimal among evaluations in the trust region. In other embodiments, the local modeling module 255 adjusts a size of the trust region. The local modeling module 255 may shrink or expand a size of the trust region. The shrinking or expansion of the trust region may further depend on a utility of a local model. For example, the resource allocation system 150 defines a utility score for each local model according to subsequent evaluations (further detailed in the sampling module 260). A trust region can be shrunk when a utility score is below some threshold while conversely the trust region can be expanded when the utility score is above another threshold or the same threshold for shrinking. In other embodiments, the rules for trust region adjustment may be converse to that described above.

Figure 4:
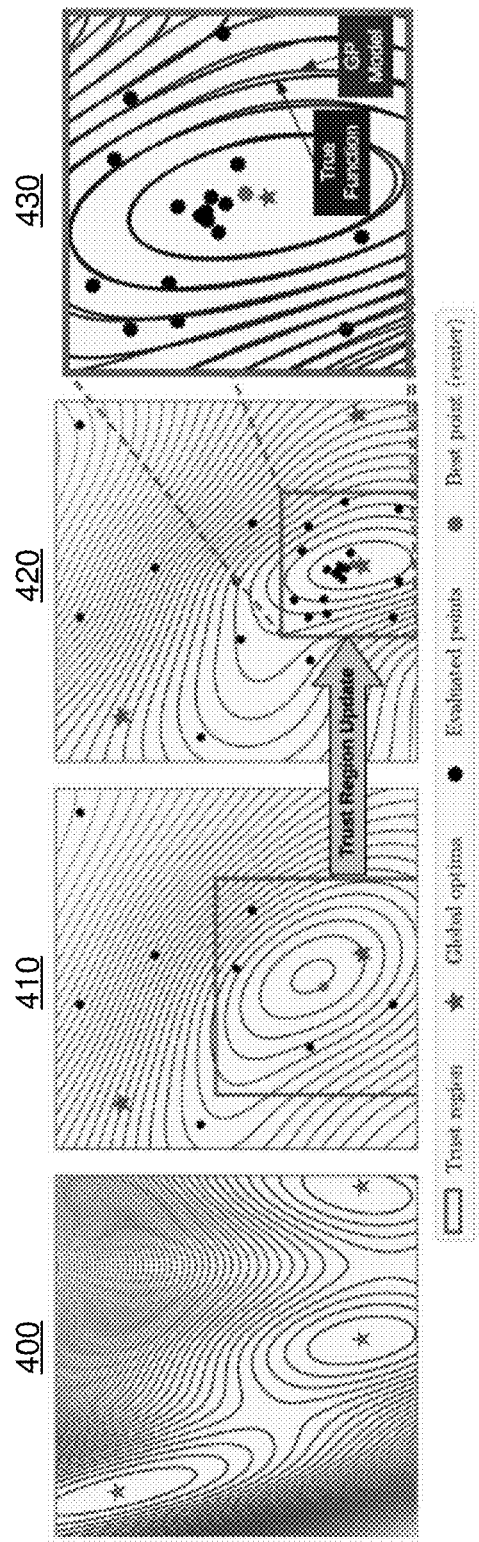
FIG. 4 illustrates a two-dimensional (2D) example evolution of a trust region for a local model, in accordance with one or more embodiments.

Referring now to FIG. 4, a two-dimensional (2D) example evolution of a trust region for a local model is shown. A first graph 400 shows a 2D true function with three global optima, shown as green stars. The second graph 410 shows eight evaluations, taken from initially evaluated candidates. A trust region, shown as the red square, is centered around the best evaluation so far among the eight evaluations. After further evaluations, e.g., through multiple iterations of Bayesian optimization, the trust region evolves. As exampled in third graph 420, the trust region has shrunk and shifted to be centered around the best evaluation amongst the evaluations in this local model. Noticeably, the local model within the trust region tends towards accuracy to the true function, which is shown in a fourth graph 430. However, outside of the trust region, the accuracy of the local model may suffer. Nonetheless, the benefit of the trust region is that the local model is not required to be fit evaluations outside the trust region which could overfit the local model but rather focuses on fitting the local model within the trust region.

Additionally, as part of the local model, the local modeling module 255 generates a prediction 295 for each of the constraint functions 235. The prediction 295 of a constraint function 235 is generated in the trust region according to one or more evaluations of the constraint function 235 within the trust region. Similar to the prediction 290 of the objective function 230, in one embodiment, the local modeling module 255 generates the predictions 295 of the constraint functions 235 as Gaussian process posterior distributions according to Gaussian process regressions based on results of evaluated candidates in the local model's trust region.

The sampling module 260 identifies one or more candidates to evaluate, e.g., during optimization of the objective function 230. In one embodiment, the sampling module 260 implements Thompson sampling to identify candidates with which to evaluate next according to the objective function 230. According to Thompson sampling, the sampling module 260 samples a function from the Gaussian process posterior distribution of a local model. According to this embodiment, the sampling module 260 identifies a candidate that has optimal value under the sampled function. In one implementation the sampling module 260 provides some or all of the candidates, identified from the local models, to the function calculation module 210 for evaluation. In some embodiments, the sampling module 260 compares the results according to the sampled functions and selects a subset of all the candidates (e.g., one, two, three, etc. candidates are in the subset) from across the local models based on the comparison. Thompson sampling is particularly useful for this task as theoretical and empirical evidence suggests that it achieves a diverse set of candidate suggestions. Moreover, computational cost of Thompson sampling scales favorably with the number of candidates identified from the local models 285.

Figure 5:
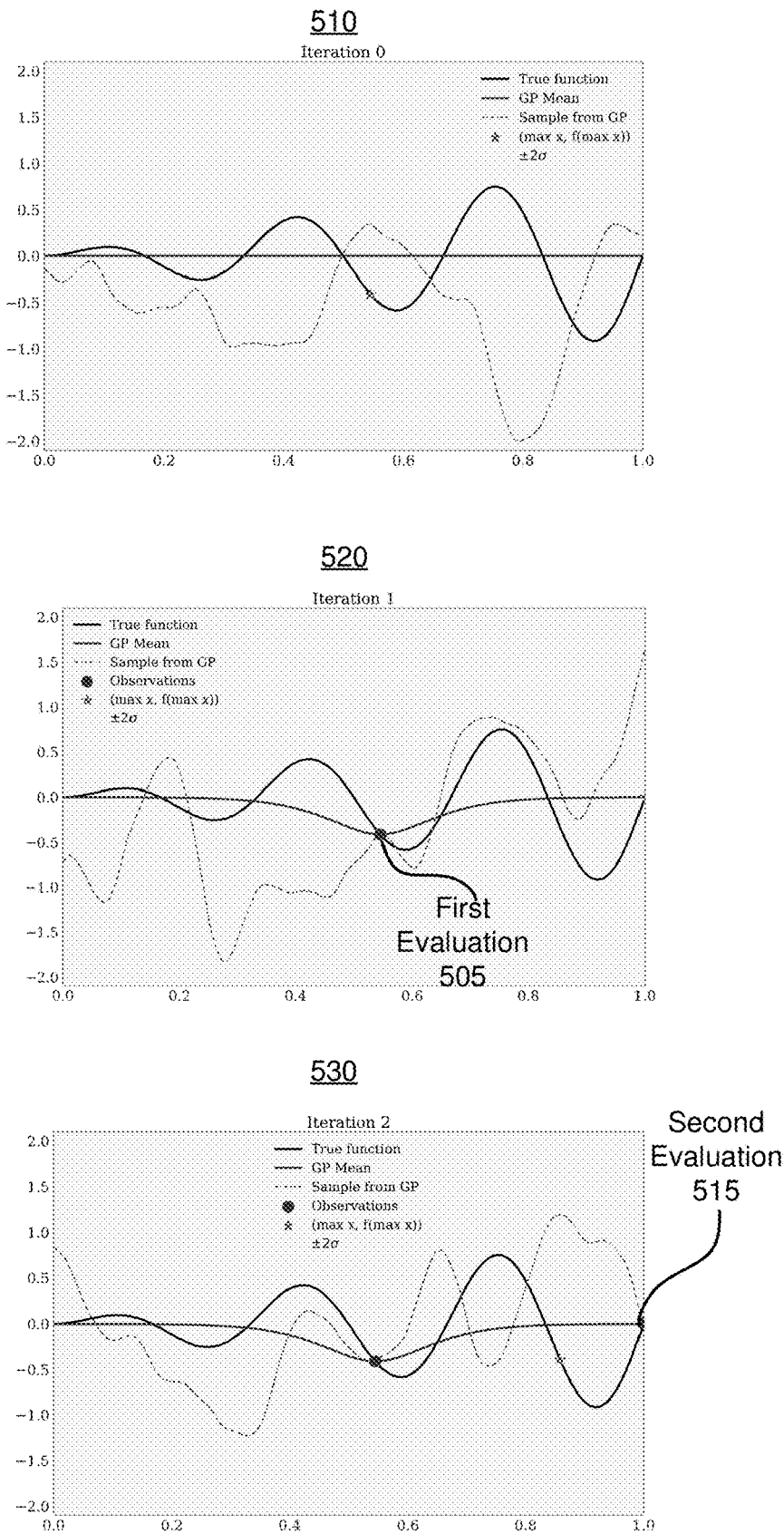
FIG. 5 illustrates a one-dimensional (1D) example of optimization with a Gaussian process posterior distribution implementing Thompson sampling, in accordance with one or more embodiments.

Referring now to FIG. 5, a one-dimensional (1D) example of maximization with a Gaussian process posterior distribution with Thompson sampling is shown. The true function $f(x)$ is a dampened sinusoidal wave illustrated as the black line. In iteration 0, top graph 510, a Gaussian process posterior distribution is centered around function Mean(x) =0. A realization $g_0(x)$ from the Gaussian process posterior distribution is sampled, shown in the red dashed line. From the sampled function, a candidate is identified with the maximal result according to the sampled function, argmax $[g_0(x)]$. In this example, the candidate point x=0.55 is chosen. A first evaluation 405 of the true result, according to the true function, is evaluated $f(0.55)=-0.45$. In line with principles described above, the Gaussian process posterior distribution is updated based on the evaluation. Middle graph 520 illustrates the first evaluation 505 at iteration 0 with updated Gaussian process posterior distribution. In this iteration, another function $g_1(x)$ is sampled, shown in the red dashed line in the middle graph 520. The next candidate point is identified similarly, argmax$[g_1(x)]$=1. A second evaluation 515 is calculated with the true function, $f(1)=0$. The Gaussian process posterior distribution is updated with the second evaluation 515. Bottom graph 530 is iteration 2 with updated Gaussian process posterior distribution with the first evaluation 505 and the second evaluation 515. Repeating the sampling process, candidate point argmax$[g_2(x)]$=0.87 is identified from sampled function $g_2(x)$ which will be used in the next iteration's evaluation.

The candidate evaluation module 265 determines a utility score for a candidate. In some embodiments, the candidate evaluation module 265 determines a utility score $u_v(x_i)$ that is based on the scores determined by the constraint evaluation module 215 using the constraint functions 235. For instance, the candidate evaluation module 265 determines a utility score $u_v(x_i)$ based on the scores for the constraints the candidate violated. For example, the candidate evaluation module 265 determines the utility score $u_v(x_i)$ for candidate $x_i$ as:

$$u_v(x_i) = \sum_{l=1}^{m} \max\{c_l(x_i), 0\} \quad (2)$$

Where m is the number of constraints being considered, $c_l(x_i)$ is the score for constraint $c_l$, and a constraint is violated when $c_l(x_i)>0$. As such, for constraints that are satisfied, the "max" function in equation (2) selects the default value of 0 instead of the actual value of $c_l(x_i)$. Moreover, for constraints that are violated, the "max" function in equation (2) selects the actual value of $c_l(x_i)$ to be added to the utility score $u_v(x_i)$. In some embodiments, the candidate evaluation module 265 determines the utility score $u_v(x_i)$ only for candidates that violate one or more constraints. In other embodiments, the candidate evaluation module 265 determines the utility score $u_v(x_i)$ for every candidate (i.e., candidates that satisfy every constraint, and candidates that violate one or more constraints).

In another example, the candidate evaluation module 265 determines a utility score $u_v(x_i)$ based on the scores for every constraint being considered. For example, the candidate evaluation module 265 determines the utility score $u_v(x_i)$ for candidate $x_i$ as:

$$u_v(x_i) = \sum_{l=1}^{m} c_l(x_i) \quad (3)$$

In some embodiments, to determine the utility score $u_v(x_i)$ the candidate evaluation module 265 additionally considers the result $f(x_i)$ for the candidate with the objective function 230 determined by the function calculation module 210. For example, the utility score $u_v(x_i)$ for the candidate may be increased based on the value of the result $f(x_i)$ for the candidate.

In some embodiments, if the candidate does not violate any constraint (i.e., if the candidate meets every constraint), the candidate evaluation module 265 determines a second utility score $u_s(x_i)$ that is based on the result $f(x_i)$ for the candidate with the objective function 230 determined by the function calculation module 210. That is, if every constraint is met by a candidate, the candidate evaluation module simply assigns the result $f(x_i)$ as the second utility score $u_s(x_i)$ for the candidate.

In other embodiments, to determine the second utility score $u_s(x_i)$ for candidates that do not violate any constraint, the candidate evaluation module 265 additionally considers the scores $c_l(x_i)$ for each constraint $c_l$. For example, the second utility score $u_s(x_i)$ for the candidate may be increased based on the value of the scores $c_l(x_i)$ for each constraint $c_l$.

The candidate selection module 270 selects a candidate from the one or more candidates identified by the sampling module 260. If one or more candidates meet all of the constraints, the candidate selection module 270 selects the candidate with the highest second utility score $u_s(x_i)$ from the candidates that meet all of the constraints. That is, the candidate selection module 270 selects the candidate that meets all of the constraints and has the highest second utility score $u_s(x_i)$. In other words, the candidates that violated one or more constraints are disregarded or not considered during the selection.

Conversely, if none of the candidates meet all of the constraints (i.e., all of the candidates violate at least one constraint), the candidate selection module 270 selects the candidate with the lowest utility score $u_v(x_i)$ (e.g., the lowest utility score $u_v(x_i)$ determined based on the scores $c_l(x_i)$ for each violated constraint $c_l$).

In some embodiments, the candidate selection module 270 considers every candidate regardless of whether the candidates violate a constraint or not, and selects the candidate with the highest utility. In different embodiments, highest utility may be defined differently depending on how the utility scores are determined. That is, a candidate with a highest utility may be defined as being a candidate with a highest utility score when the utility score is decreases based on constraint violations. Conversely, a candidate with a highest utility may defined as being a candidate with a lowest utility score when the utility score increases for each violated constraint. For example, in some embodiments, violations of a constraint may decrease the utility value for a candidate (e.g., by assigning a negative utility value). As such, candidates that violate one or more constraints may have negative utility scores, whereas candidates the meet every constraint have positive utility scores.

Based on the selected candidate, the local models 285 may be updated by the local modeling module 255. For instance, a new observation is determined using the selected candidate. That is, the selected candidate may be evaluated using the objective function 230 by the function calculation module 210 and using the constraint functions 235 by the constraint evaluation module 215. Then the local modeling module 255 determines if the selected candidate is better than the current best candidate for the local model 285 (e.g., better than the current center of the local model 285). If the selected candidate is better than the current best candidate, the trust region of the local model 285 is re-centered to the selected candidate. Moreover, regardless of whether the selected candidate is better than the current best candidate, the prediction 290 of the objective function 230 and the predictions 295 of the constraint functions 235 are updated based on the new observation for the selected candidate.

The store 280 stores the local models 285. The local models 285 used by the local modeling module 255 and the sampling module 260 may be generated and/or updated and then stored in the store 280. Each local module 285 includes a prediction 290 of the objective function 230 and predictions 295 for each constraint function 235.

Resource Allocation Algorithm

Figure 6:
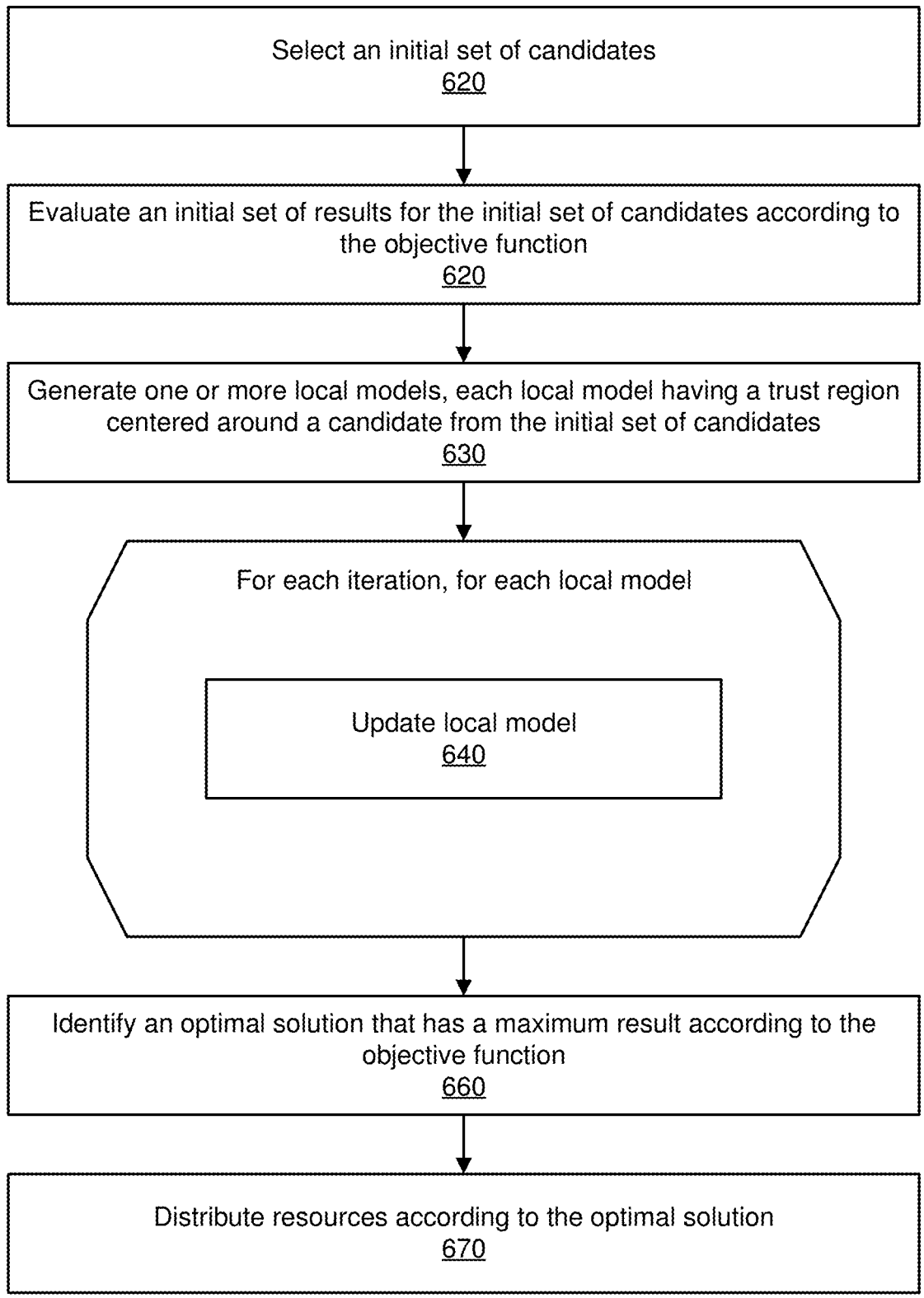
FIG. 6 illustrates a flowchart for solving an objective function with trust region modeling while constraining the result to satisfy a set of constraints, in accordance with one or more embodiments.

FIG. 6 illustrates a flowchart 600 for solving an objective function with one or more trust region modeling while constraining the result to satisfy a set of constraints, in accordance with one or more embodiments. The flowchart 600 may be performed by the resource allocation system 150 and the function optimizer 155. In other embodiments, other systems may utilize the flowchart 600 for optimizing distribution of resources according to their own objective functions. In other embodiments, more generally, the online system 120 (e.g., a transport service system) performs the steps below. According to various embodiments, the resource allocation system 150 and the function optimizer 155 can be any computing system or cluster of computing systems.

At step 610, the initialization module 250 of the function optimizer 155 selects an initial set of candidates. For example, the initialization module 250 randomly selects points in Ω space as the initial set of candidates. Moreover, the initialization module 250 may determine a number of candidates to select for the initial set of candidates. For example, the number of candidates may be dependent on an amount of computing resources available to the function optimizer 155.

At step 620, the function calculation module 210 of resource allocation system 150 evaluates an initial set of results for an initial set of candidates according to an objective function 230. In some embodiments, the constraint evaluation module 215 of the resource allocation system 150 evaluates the set of constraints for each of the candidates in the initial set of candidates according to the constraint functions 235. The objective function can be a higher-dimensional function. For example, the objective function can be a resource allocation function. In an example with a transport service system, the variables may correspond to various incentives provided to drivers or riders over a plurality of cities. An evaluation of the objective function includes an input candidate used as input to the objective function and a result that is output by the objective function based on the input candidate. The evaluations may be tabulated by the resource allocation system 150.

At step 630, the local modeling module 255 of the function optimizer 155 one or more local models. Each local model has a trust region centered around an initial candidate from the initial set of candidates. Each local model includes a prediction 290 for the objective function 230 and predictions 295 for each of the constraint function 235. The prediction 290 for the objective function 230 and predictions 295 for each of the constraint function 235 are generated based on the evaluation of the initial set of results for the initial set of candidates. For example, the prediction 290 for the objective function 230 is a Gaussian process posterior distribution that models the objective function 230 within the trust region. Although the local model 285 is not bounded by the trust region, the accuracy of the local model may significantly decrease outside of the corresponding trust region.

In some embodiments, the local modeling module 255 of the function optimizer 155 generates fewer local models 285 than the number of candidates in the initial set of candidates. For example, the local modeling module 255 of the function optimizer 155 generates a single local model 285 based on the candidates in the initial set of candidates. In this embodiment, the candidates in the initial set of candidates are ranked based on their respective utility scores and a candidate with the highest score is selected as the center of the trust region for the local model 285.

At step 640, the function optimizer iteratively updates each of the local models 285. The process for updating a local model 285 during one iteration of the iterative step is described below in conjunction with FIG. 7.

At step 660, the resource allocation system 150 identifies an optimal solution that has an optimal result according to the objective function 230. The optimal solution is chosen or selected from among completed evaluations inclusive of initial evaluations and subsequent evaluations taken at step 640. The optimal solution is a best guess to the true optimal solution of the objective function 230 that satisfies each of the constraints imposed by the resource allocation system 150.

At step 670, the resource allocation system 150 distributes resources according to the optimal solution. The values in the optimal solution are used to dictate distribution of resources in what quantity. Each variable can pertain to a different entity that consumes the resource.

Local Model Refinement for Optimization of Objective Function

Figure 7:
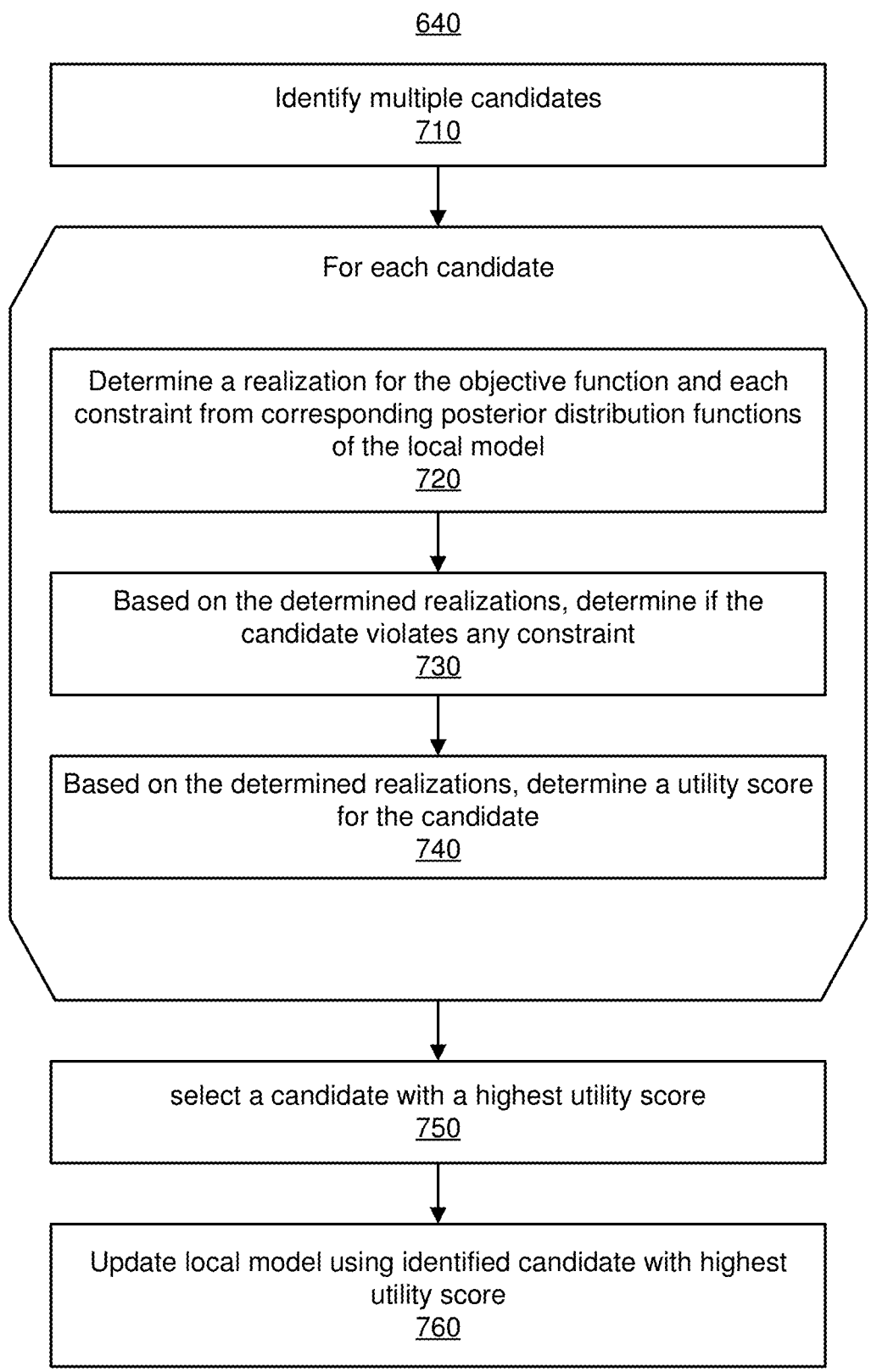
FIG. 7 illustrates a flowchart updating a local model during an iterative refinement of the local model to identify an optimal solution of an objective function, in accordance with one or more embodiments.

FIG. 7 illustrates a flowchart updating a local model during an iterative refinement of the local model to identify an optimal solution of an objective function, in accordance with one or more embodiments. In particular, FIG. 7 shows a flowchart of the process for performing step 640 of FIG. 6, in accordance with one or more embodiments.

At step 710, the sampling module 260 of the function optimizer 155 identifies one or more candidates to be considered during the iteration. For example, the sampling module 260 identifies a set number of candidates based on a predetermined algorithm.

At step 720, for each candidate identified by the sampling module 260, a realization is determined from the local model 285. That is, the realization is determined from the prediction 290 of the objective function 230 and from the predictions 295 of the constraint functions 235. For instance, this yields a realization sampled from the Gaussian process posterior distribution for the objective function 230 and the Gaussian process posterior distributions for the constraint functions 235.

At step 730, for each candidate identified by the sampling module 260, the candidate evaluation module 265 of the function optimizer 155 determines whether the candidate violates any constraint based on the determined realizations.

At step 740, for each candidate identified by the sampling module 260, the candidate evaluation module 265 of the function optimizer 155 determines a utility score. The function used to determine the utility score may be determined based on the previous determination of whether the candidate violates any constraint. For example, if the candidate violates one or more constraints, the candidate evaluation module 265 determines a utility score that is based on the determined realizations for the violated constraints. That is, the candidate evaluation module 265 determines a utility score based on the output of the predictions 295 of the constraint functions 295 that were violated by the candidate. Conversely, if the candidate satisfies every constraint, the candidate evaluation module 265 determines a utility score that is based on the determined realizations obtained from the prediction 290 of the objective function 230. That is, the candidate evaluation module 265 determines a utility score that is based on the determined realizations obtained from the Gaussian process posterior distribution for the objective function 230.

At step 750, the candidate selection module 270 of the function optimizer 155 selects a candidate with the highest utility. In some embodiments, when a constraint l is defined as being violated when $c_l(x_i) > 0$, the candidate with the highest utility is defined as the candidate with the lowest utility score. In some embodiments, the candidate selection module 270 determines if any of the candidates satisfy every constraint and selects the candidate with the highest second utility score from the candidates that satisfies every constraint. Otherwise, the candidate selection module 270 selects the candidate with the lowest utility score from the candidates that violate one or more constraints.

For example, if the utility score determined using equation (2) is used, the candidate selection module 270 identifies the candidates with the lowest utility score $u_v(x_i)$. Since equation (2) uses the default value of 0 for constraints that are satisfied, if one or more candidates satisfy every constraint, the utility score $u_v(x_i)$ for the candidates that satisfy every constraint is 0. Moreover, since a constraint is violated when $c_l(x_i) > 0$, candidates that violate one or more constraints have a utility score $u_v(x_i)$ that is greater than 0. As such, if one or more candidates satisfy every constraint, the candidates that satisfy every constraint will have the lowest utility score $u_v(x_i)$.

Moreover, if two or more candidates have the same lowest utility score $u_v(x_i)$, the second utility score $u_s(x_i)$ may be used to select one candidate among the candidates with the same lowest utility score $u_v(x_i)$. For instance, if multiple candidates satisfy every constraint, each of those candidates will have the lowest utility score of 0. As such, the second utility score $u_s(x_i)$ may be used to select a candidate from the candidates having a utility score $u_v(x_i)$ of 0. Additionally, if the value of $f(x_i)$ is assigned to be the second utility score $u_s(x_i)$, when multiple candidates satisfy every constraint, the candidate having the highest result $f(x_i)$ and satisfying every constraint is selected.

At step 760, the local modeling module 255 of the function optimizer 155 updates the local model 285 using the selected candidate. The process for updating a local model 285 using the selected candidate is described below in conjunction with FIG. 8.

FIG. 8 illustrates a flowchart updating a local model using a selected candidate, in accordance with one or more embodiments. In particular, FIG. 8 shows a flowchart of the process for performing step 760 of FIG. 7, in accordance with one or more embodiments.

At step 810, a new observation is determined for the selected candidate with the highest utility score. That is, the function calculation module 210 determines an output of the objective function 230 for the selected candidate, and the constraint evaluation module 215 determines an output of each of the constraint functions 235 for the selected candidate.

At step 820, the local modeling module 255 of the function optimizer 155 updates the local model 285 to include the new observation for the selected candidate. That is, the local modeling module 255 updates the prediction 290 of the objective function 230 to include the new observation for the selected candidate. Moreover, the local modeling module 255 updates the predictions 295 of the constraint functions 235 to include the new observation for the selected candidate.

At step 830, the local modeling module 255 of the function optimizer 155 determines if the selected candidate has a higher utility than the current best candidate of the local model 285. In some embodiments, the current best candidate of the local model 285 is the center of the trust region. As such, the function optimizer 155 determines if the selected candidate has a higher utility than the candidate at the center of the trust region.

In some embodiments, to compare the selected candidate to the current best candidate, a true utility score for the selected candidate is first determined. The true utility score is a utility score determined for the selected candidate based on the new observation, instead of the previously calculated utility score that was calculated based on a realization determined from the local model 285.

If the selected candidate has a utility larger than the utility of the current best candidate, the local modeling module 255 identifies the iteration as a success. If the iteration is a success, the process proceeds to step 840. Otherwise, the process proceeds to step 855.

At step 840, the local modeling module 255 re-centers the trust region of the local model 285 to the selected candidate. That is, the local modeling module 255 sets the selected candidate as the new center for the trust region of the local model 285.

At step 850, if the iteration is a success, the local modeling module 255 increases a success counter $n_s$. Conversely, at step 855, if the iteration is a not success, the local modeling module 255 increases a failure counter $n_f$.

At step 860, based on the success counter $n_s$ and the failure counter $n_f$, the local modeling module 255 resizes the trust region of the local model. The process for resizing the trust region of a local model is described below in conjunction with FIG. 9.

Figure 9:
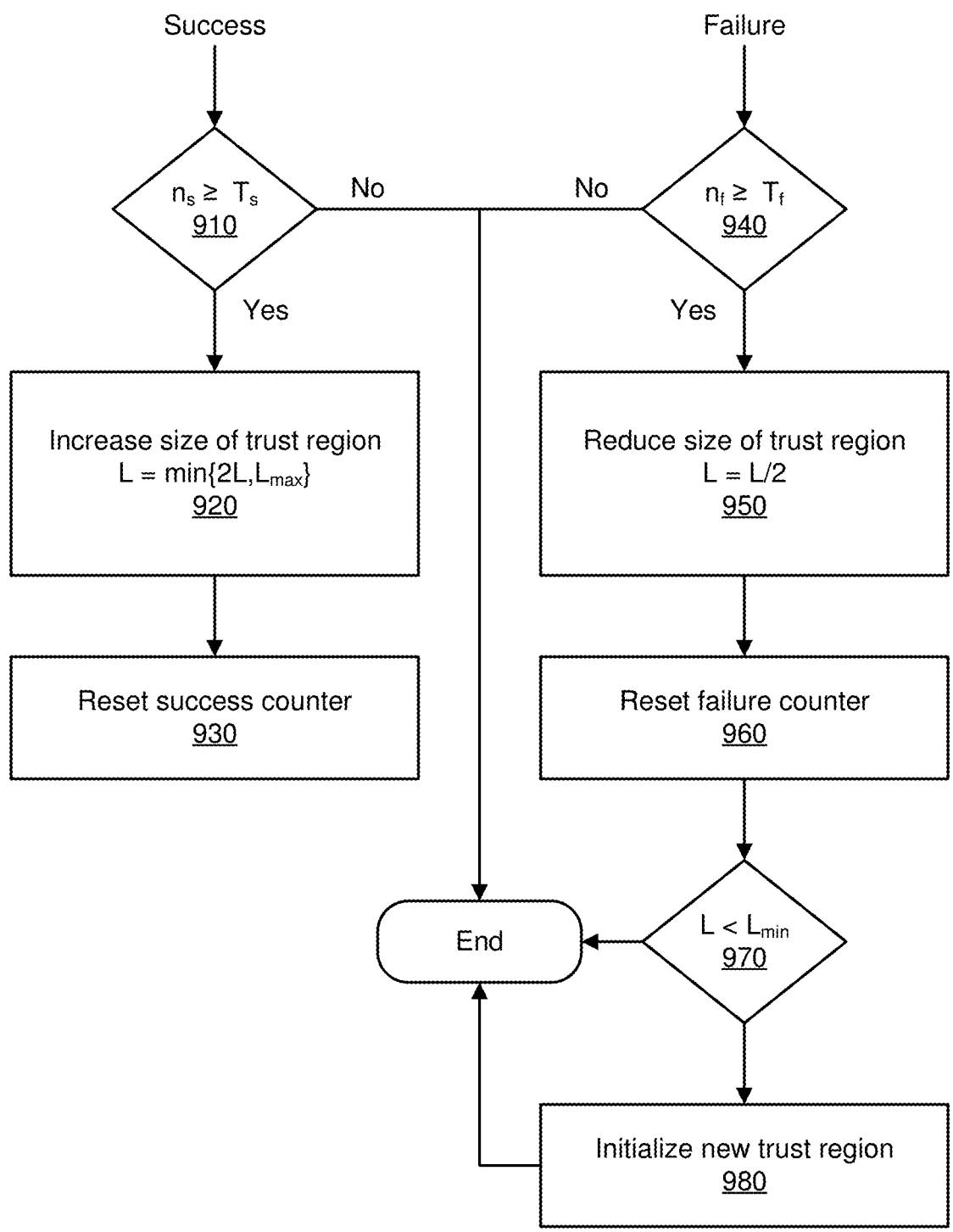
FIG. 9 illustrates a flowchart for resizing the trust region of a local model, in accordance with one or more embodiments.

FIG. 9 illustrates a flowchart for resizing the trust region of a local model, in accordance with one or more embodiments. In particular, FIG. 9 shows a flowchart of the process for performing step 860 of FIG. 8, in accordance with one or more embodiments. If the iteration was a success, the process starts a step 910. Otherwise, if the iteration was not a success (i.e., the iteration was a failure), the process starts at step 940.

At step 910, the local modeling model 255 of the function optimizer 155 determines if the success counter $n_s$ is larger than a threshold value $T_s$ (e.g., $T_s=3$). If the success counter $n_s$ is larger than or equal to a threshold value $T_s$, the process proceeds to step 920. Otherwise, if the success counter $n_s$ is smaller than a threshold value $T_s$, the process for resizing the trust region of the local model ends.

At step 920, the local modeling model 255 of the function optimizer 155 increases the size of the trust region. In some embodiments, the length L of the trust region is doubled. In some embodiments, the local modeling model 255 increases the length L of the trust region up to a maximum length $L_{max}$. For instance, the local modeling model 255 sets the length L as:

$$L=\min(2L, L_{max}) \qquad (4)$$

At step 930, the local modeling model 255 of the function optimizer 155 resets the success counter $n_s$. In some embodiments, at step 930, the local modeling model 255 further resets the failure counter $n_f$.

At step 940, the local modeling model 255 of the function optimizer 155 determines if the failure counter $n_f$ is larger than a threshold value $T_f$ (e.g., $T_f=3$). If the failure counter $n_f$ is larger than or equal to a threshold value $T_f$, the process proceeds to step 950. Otherwise, if the failure counter $n_f$ is smaller than a threshold value $T_f$, the process for resizing the trust region of the local model ends.

At step 940, the local modeling model 255 of the function optimizer 155 reduces the size of the trust region. In some embodiments, the length L of the trust region is reduced by half. That is, the local modeling model 255 sets the length L as:

$$L=L/2 \qquad (5)$$

At step 960, the local modeling model 255 of the function optimizer 155 resets the failure counter $n_f$. In some embodiments, at step 960, the local modeling model 255 further resets the success counter $n_s$.

At step 970, the local modeling model 255 of the function optimizer 155 determines if the length L of the trust region of the local model is smaller than a minimum length $L_{min}$. If length L of the trust region of the local model is smaller than a minimum length $L_{min}$, the function optimizer 155 initializes a new trust region. For instance, if length L of the trust region of the local model is smaller than a minimum length $L_{min}$, the process returns to step 620 of FIG. 6.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method for incentivizing a plurality of drivers dispersed across a plurality of locations, the method comprising:

receiving, via encrypted communication from a client device of each driver of the plurality of drivers, a real-time position of the driver represented by global coordinates measured by a global positioning system (GPS) receiver coupled to the client device of the driver, the real-time positions of the drivers including one or more new drivers;

receiving, via encrypted communication from a client device of each rider of a plurality of riders, a position of the rider represented by global coordinates measured by a GPS received coupled to the client device of the rider;

evaluating an initial set of results for a set of initial candidates according to at least an objective function, the objective function defining a high-dimensional search space and configured to receive as input a plurality of variables related to positioning of drivers and riders dispersed across the plurality of locations and to output a result based on the input, wherein the result relates to an efficiency in completion of one or more tasks by the plurality of drivers at the plurality of locations;

generating a local model based on the initial set of results, by:

generating a Gaussian process posterior distribution based on the initial results of the initial candidates, and defining a trust region centered around a current best candidate of the initial candidates;

iteratively updating the local model to explore the high-dimensional search space by:

identifying a plurality of new candidates;

determining, for each new candidate of the plurality of new candidates, a prediction of whether the new candidate violates a constraint based on the local model;

determining, for each new candidate of the plurality of new candidates, a utility score for the new candidate, the utility score for the new candidate at least based on the prediction of whether the new candidate violates a constraint;

selecting a new candidate from the plurality of new candidates based on the utility scores of each of the new candidates;

evaluating a subsequent result for the selected new candidate, the subsequent result evaluated according to at least the objective function;

updating the Gaussian process posterior distribution based on the subsequent result;

determining whether the selected new candidate has a utility score greater than a utility score of the current best candidate of the local model; and responsive to determining that the utility score of the selected new candidate is greater than the utility score of the current best candidate, re-centering the trust region around the selected new candidate;

identifying an optimal solution from the updated local model;

determining an incentive to provide to each driver based on the optimal solution; and generating, via the client device of each driver, an interactive user interface for each driver displaying a map of a geographic region pertaining to the real-time position of the candidate driver and the incentive, wherein the interactive user interface displays the real-time position of the driver in the map of the geographic region.

2. The method of claim 1, wherein the objective function is associated with a transport service system, and wherein the plurality of variables include, over a plurality of cities, incentives for drivers of each city of the plurality of cities, and incentives for riders of each city of the plurality of cities.

3. The method of claim 1, wherein determining whether the selected new candidate has a utility score greater than a utility score of a current best candidate of the local model comprises:

evaluating, for the selected new candidate, a constraint score for each constraint;

determining a true utility score for the selected new candidate based on the evaluated constraint score for each constraint; and comparing the true utility score for the selected new candidate to the utility score of the current best candidate.

4. The method of claim 1, wherein the initial set of results for the set of initial candidates is further evaluated according to a set of constraint functions corresponding to a set of constraints to be satisfied.

5. The method of claim 1, wherein the prediction of whether the new candidate violates a constraint includes a prediction score for the new candidate, and wherein determining the utility score for the new candidate comprises:

responsive to determining that the prediction indicates that the new candidate violates at least one constraint, determining the utility score by adding the prediction score for each constraint predicted to be violated by the new candidate; and responsive to determining that the prediction indicates that the new candidate does not violate any constraint, assigning a prediction of an output of the objective function for the new candidate as the utility score.

6. The method of claim 1, wherein selecting the new candidate from the plurality of new candidates based on the utility scores of each of the new candidates comprises:

responsive to determining that the prediction for each new candidate indicates that one or more new candidates satisfy every constraint, selecting, from the new candidates having a prediction indicating that the new candidate satisfies every constraint, a new candidate with a highest utility score; and responsive to determining that the prediction for each new candidate indicates that every new candidate violates at least one constraint, selecting a new candidate with the highest utility score.

7. The method of claim 1, wherein the high-dimensional space is defined by twenty or more variables.

8. The method of claim 7, wherein the trust region is a hypercube.

9. The method of claim 1, wherein updating the local model further comprises:

adjusting a size of the trust region based on the subsequent result of the selected new candidates.

10. The method of claim 9, wherein updating the local model further comprises:

adjusting a shape of the trust region based on the subsequent result of the selected new candidates.

11. The method of claim 1, wherein identifying the plurality of new candidates comprises performing Thompson sampling on the Gaussian posterior process distribution.

12. A non-transitory computer-readable storage medium storing instructions for incentivizing a plurality of drivers across a plurality of locations, the instructions that, when executed by a processor, cause the processor to perform operations comprising:

receiving, via encrypted communication from a client device of each driver of the plurality of drivers, a real-time position of the driver represented by global coordinates measured by a global-positioning system (GPS) receiver coupled to the client device of the driver, the real-time positions of the drivers including one or more new drivers;

receiving, via encrypted communication from a client device of each rider of a plurality of riders, a position of the rider represented by global coordinates measured by a GPS received coupled to the client device of the rider;

evaluating an initial set of results for a set of initial candidates according to at least an objective function, the objective function defining a high-dimensional search space and configured to receive as input a plurality of variables related to positioning of drivers and riders dispersed across the plurality of locations and to output a result based on the input, wherein the result relates to an efficiency in completion of one or more tasks by the plurality of drivers at the plurality of locations;

generating a local model based on the initial set of results, by:

generating a Gaussian process posterior distribution based on the initial results of the initial candidates, and defining a trust region centered around a current best candidate of the initial candidates;

iteratively updating the local model to explore the high-dimensional search space by:

identifying a plurality of new candidates;

determining, for each new candidate of the plurality of new candidates, a prediction of whether the new candidate violates a constraint based on the local model;

determining, for each new candidate of the plurality of new candidates, a utility score for the new candidate, the utility score for the new candidate at least based on the prediction of whether the new candidate violates a constraint;

selecting a new candidate from the plurality of new candidates based on the utility scores of each of the new candidates;

evaluating a subsequent result for the selected new candidate, the subsequent result evaluated according to at least the objective function;

updating the Gaussian process posterior distribution based on the subsequent result;

determining whether the selected new candidate has a utility score greater than a utility score of the current best candidate of the local model; and responsive to determining that the utility score of the selected new candidate is greater than the utility score of the current best candidate, re-centering the trust region around the selected new candidate;

identifying an optimal solution from the updated local model;

determining an incentive to provide to each driver based on the optimal solution; and generating, via the client device of each driver, an interactive user interface for each driver displaying a map of a geographic region pertaining to the real-time position of the candidate driver and the incentive, wherein the interactive user interface displays the real-time position of the driver in the map of the geographic region.

13. The non-transitory computer-readable storage medium of claim 12, wherein the objective function is associated with a transport service system, and wherein the plurality of variables include, over a plurality of cities, incentives for drivers of each city of the plurality of cities, and incentives for riders of each city of the plurality of cities.

14. The non-transitory computer-readable storage medium of claim 12, wherein determining whether the selected new candidate has a utility score greater than a utility score of a current best candidate of the local model comprises:

evaluating, for the selected new candidate, a constraint score for each constraint;

determining a true utility score for the selected new candidate based on the evaluated constraint score for each constraint; and comparing the true utility score for the selected new candidate to the utility score of the current best candidate.

15. The non-transitory computer-readable storage medium of claim 12, wherein the initial set of results for the set of initial candidates is further evaluated according to a set of constraint functions corresponding to a set of constraints to be satisfied.

16. The non-transitory computer-readable storage medium of claim 12, wherein the prediction of whether the new candidate violates a constraint includes a prediction score for the new candidate, and wherein determining the utility score for the new candidate comprises:

responsive to determining that the prediction indicates that the new candidate violates at least one constraint, determining the utility score by adding the prediction score for each constraint predicted to be violated by the new candidate; and responsive to determining that the prediction indicates that the new candidate does not violate any constraint, assigning a prediction of an output of the objective function for the new candidate as the utility score.

17. The non-transitory computer-readable storage medium of claim 12, wherein selecting the new candidate from the plurality of new candidates based on the utility scores of each of the new candidates comprises:

responsive to determining that the prediction for each new candidate indicates that one or more new candidates satisfy every constraint, selecting, from the new candidates having a prediction indicating that the new candidate satisfies every constraint, a new candidate with a highest utility score; and responsive to determining that the prediction for each new candidate indicates that every new candidate violates at least one constraint, selecting a new candidate with the highest utility score.

18. A computing system for incentivizing a plurality of drivers dispersed across a plurality of locations, the computing system comprising:

a processor; and a non-transitory computer-readable storage medium storing instructions that, when executed by the processor, cause the processor to perform operations comprising:

receiving, via encrypted communication from a client device of each driver of the plurality of drivers, a real-time position of the driver represented by global coordinates measured by a global positioning system (GPS) receiver coupled to the client device of the driver, the real-time positions of the drivers including one or more new drivers;

receiving, via encrypted communication from a client device of each rider of a plurality of riders, a position of the rider represented by global coordinates measured by a GPS received coupled to the client device of the rider;

evaluating an initial set of results for a set of initial candidates according to at least an objective function, the objective function defining a high-dimensional search space and configured to receive as input a plurality of variables related to positioning of drivers and riders dispersed across the plurality of locations and to output a result based on the input, wherein the result relates to an efficiency in completion of one or more tasks by the plurality of drivers at the plurality of locations;

generating a local model based on the initial set of results, by:

generating a Gaussian process posterior distribution based on the initial results of the initial candidates, and defining a trust region centered around a current best candidate of the initial candidates;

iteratively updating the local model to explore the high-dimensional search space by:

identifying a plurality of new candidates;

determining, for each new candidate of the plurality of new candidates, a prediction of whether the new candidate violates a constraint based on the local model;

determining, for each new candidate of the plurality of new candidates, a utility score for the new candidate, the utility score for the new candidate at least based on the prediction of whether the new candidate violates a constraint;

selecting a new candidate from the plurality of new candidates based on the utility scores of each of the new candidates;

evaluating a subsequent result for the selected new candidate, the subsequent result evaluated according to at least the objective function;

updating the Gaussian process posterior distribution based on the subsequent result;

determining whether the selected new candidate has a utility score greater than a utility score of the current best candidate of the local model; and responsive to determining that the utility score of the selected new candidate is greater than the utility score of the current best candidate, re-centering the trust region around the selected new candidate;

identifying an optimal solution from the updated local model;

determining an incentive to provide to each driver based on the optimal solution; and generating, via the client device of each driver, an interactive user interface for each driver displaying a map of a geographic region pertaining to the real-time position of the candidate driver and the incentive, wherein the interactive user interface displays the real-time position of the driver in the map of the geographic region.

19. The system of claim 18, wherein the objective function is associated with a transport service system, and wherein the plurality of variables include, over a plurality of cities, incentives for drivers of each city of the plurality of cities, and incentives for riders of each city of the plurality of cities.

* * * * *